US012675471B2

(12) United States Patent
Raal et al.

(10) Patent No.: US 12,675,471 B2
(45) Date of Patent: Jul. 7, 2026

(54) DOMAIN SPECIFIC INTELLIGENCE USING NATURAL LANGUAGE

(71) Applicant: Disney Enterprises, Inc., Burbank, CA (US)

(72) Inventors: David DeWet Raal, Los Angeles, CA (US); Jason Alexander Cox, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/790,199

(22) Filed: Jul. 31, 2024

(65) Prior Publication Data

US 2026/0037501 A1      Feb. 5, 2026

(51) Int. Cl.
| | |
|---|---|
| *G06F 16/242* | (2019.01) |
| *G06F 16/2458* | (2019.01) |
| *G06F 16/901* | (2019.01) |

(52) U.S. Cl.
CPC ........ G06F 16/243 (2019.01); G06F 16/2468 (2019.01); G06F 16/9024 (2019.01)

(58) Field of Classification Search
CPC . G06F 16/243; G06F 16/2468; G06F 16/9024
USPC ........................................ 707/771
See application file for complete search history.

(56) References Cited

U.S. PATENT DOCUMENTS

| | | | | |
|---|---|---|---|---|
| 11,650,996 | B1 * | 5/2023 | Daianu | G06N 20/00 |
| | | | | 707/771 |
| 2003/0069873 | A1 * | 4/2003 | Fox | G06F 16/951 |
| 2006/0167857 | A1 * | 7/2006 | Kraft | G06F 16/24575 |
| 2010/0070448 | A1 * | 3/2010 | Omoigui | H10F 39/1825 |
| | | | | 706/55 |
| 2012/0158791 | A1 * | 6/2012 | Kasneci | G06F 16/9024 |
| | | | | 707/E17.03 |
| 2013/0268533 | A1 * | 10/2013 | Komarov | G06F 16/953 |
| | | | | 707/E17.03 |
| 2020/0005134 | A1 * | 1/2020 | Ramanath | G06N 3/08 |
| 2022/0414228 | A1 * | 12/2022 | Difonzo | G06F 40/169 |
| 2024/0394251 | A1 * | 11/2024 | Brende | G06F 16/24522 |
| 2025/0077538 | A1 * | 3/2025 | Fozdar | G06F 8/20 |
| 2025/0291827 | A1 * | 9/2025 | Chong | G06F 16/3329 |

* cited by examiner

*Primary Examiner* — Giovanna B Colan
(74) *Attorney, Agent, or Firm* — Patterson + Sheridan, LLP; Gero G. McClellan

(57) ABSTRACT

Techniques for generating a result for a search query. These techniques include identifying a complex search query including more than two parameters, dividing the complex search query into one or more components, and determining an intent for each of the one or more components using machine learning (ML), the ML including at least one of: a large language model (LLM) or natural language processing (NLP) neural network. The techniques further include generating a result for the search query based on routing each component through a pipeline using the respective intent, the pipeline including both a query against a graph database and a search against a vector database.

20 Claims, 8 Drawing Sheets

400

DOMAIN SPECIFIC INTELLIGENCE USING NATURAL LANGUAGE

BACKGROUND

With the rapid emergence of sophisticated chat-based artificial intelligence (AI) and machine learning (ML) models, many users now expect to ask natural language questions and receive back coherent detailed answers. In the public domain, a growing number of ML based Large Language Models (LLMs) provide this. For proprietary data, however, or data with a real-time component, these LLMs are often unable to provide coherent or current answers to questions.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
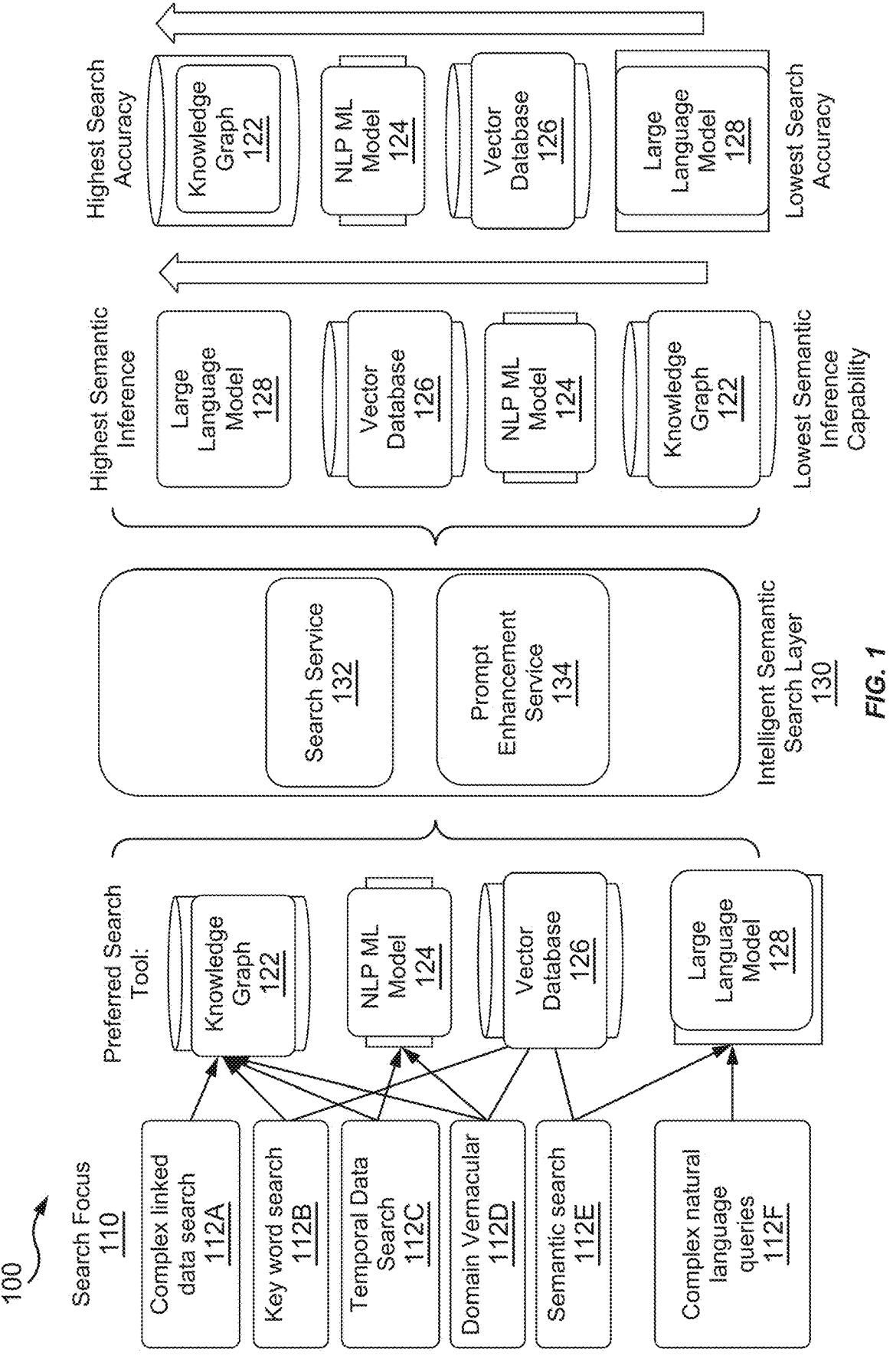
FIG. 1 is a block diagram illustrating domain specific search and inference technologies using natural language, according to one embodiment.

One or more embodiments disclosed herein provide a configurable architecture for search and inference that uses ML technologies to deliver more timely and accurate responses to natural language queries (e.g., queries for domain specific data, time specific data, both, or any other suitable queries). In an embodiment, this can be done by combining multiple technologies and data from disparate systems, and leveraging each technology to best answer different portions of a natural language query prompt.

For example, natural language processing (NLP) (e.g., a suitable trained NLP neural network) can be used for named entity identification and temporal analysis, while sentence transformers can be used with a vector database for broad based natural language semantic queries (e.g., on domain specific data). A suitable LLM can be used to perform sentence inference and dynamic graph query generation, and a graph database can be used to provide a centralized data store of domain knowledge and an advanced query engine to link data to entities (e.g., locations, menus, key words, wait times, schedules, prices, availability, or any other suitable data). In an embodiment, the graph database also provides a storage mechanism to persist pipeline steps and other configuration data (e.g., LLM prompts and any other suitable data).

For example, one or more techniques discussed herein can provide a configurable pipeline that functions like a prefrontal cortex. In an embodiment, the pipeline can parse a query input sentence to classify the incoming data on multiple dimensions (e.g., akin to figuring out what areas of the "brain" needs to be involved). The pipeline can direct the query to the appropriate area(s) of the "brain" (e.g., data stores, AI/ML models, or any other suitable destination) that can best answer the different parts of the question (e.g., based on the classifiers).

Further, each section of the pipeline can add more data and classifiers to the incoming request, and this can be leveraged by the downstream portions of the pipeline (e.g., akin to working memory in the "brain", enhancing, filtering and scoping the question). The path traveled can be directed by the configure pipeline graph path, which can re-analyze the next steps to take after each step (e.g., as discussed below in relation to FIGS. 5 and 7A-B). Paths can diverge and re-merge based on the data at the path junctions. Weighting of the path nodes allows configuration of how to branch (e.g., how to choose the least cost path). Once all steps have been run in the path, the pipeline completes its processing, and returns the requested data (e.g., ranked by the closest matches).

In an embodiment, one or more techniques disclosed herein provide significant advantages over prior solutions. For example, previous search solutions often rely on text search engines. These solutions were good at matching on keyword searches, but had little inherent understanding of a natural language prompt and the semantic meaning of words. This lack of semantic understanding can lead to inaccurate or no search results unless the prompt contains the exact keywords indexed. The searches cannot find data that is indexed to key words that are similar in meaning to the query prompt. Graph databases can also provide powerful searches across large amounts of data, but they typically lack natural language processing or understanding and require precise queries.

Simple text or graph searching can be improved through the use of a vector database and an LLM. This can be referred to as retrieval augmented generation (RAG). But this only provides a partial solution. More complex search nuances such as location, or linked, nested, or complex data models, are not well-handled. Vector databases can also struggle to provide accurate temporal searches (e.g., "find me the schedule for a theme park for next weekend"). The nature of a vector database (e.g., high dimensional numeric representations of sentence meanings) is not suited to performing temporal queries. A vector search could provide a schedule linked to an entity, but it would not know the dates or times the natural language query is looking for, and the schedule may be out of date. It can also take significant time to load the data due to the complex sentence embedding ML models. LLMs generally cannot be re-trained or fine-tuned with near real-time data, because this would be prohibitively computationally expensive and difficult. Thus, neither vector databases nor LLMs are able to provide near real-time data for time sensitive queries, and they typically require being pre-trained and loaded with data to perform queries, which is time consuming and computationally intensive. Further, LLMs by themselves often contain a vast amount of knowledge, but that data is limited to the time the relevant LLMs were trained, and an LLM can be prone to hallucinations if knowledge is not known or core to its training.

As another example, vector databases and LLMs are generally not suited for queries tied to a user's present location. For example, imagine a request: "Find the nearest restrooms to me" when a user is in a particular commercial location (e.g., a theme park or resort). A vector database or LLM cannot readily handle this query. A knowledge graph, however, can store the geographic locations of entities and if the user is using their cell phone to ask this question, their exact location can be passed in. As discussed below, one or more embodiments discussed herein can infer an intent of "find near me" and extract the type of entity and other search parameters. A search pipeline can then find entities of the right type and calculate their distance from the user's location.

One or more embodiments disclosed herein provide a multi-dimensional query approach using multiple technologies and a processing pipeline algorithm to produce a more insightful search than any one technology can provide. In an embodiment, this includes extracting named entities and their data types using an enhanced NLP ML model (e.g., a neural network) for Named Entity Recognition (NER), or a fine-tuned local LLM. This allows the search algorithm to understand complex domain-specific vernacular. Further, in an embodiment, extracting temporal data from query prompts (e.g., using an NLP neural net parser or LLM) provides another level of semantic query insight.

Further, in an embodiment, prompt enhancements based on previous classifications can improve search performance and remove unrelated words from a general search of data. Intelligent semantic search of data indexed in a vector database can provide semantic query insight, and prompt analysis data obtained during pipeline operation can be used to complete the pipeline processing. In an embodiment, pipeline processing can leverage insights from earlier parts of the processing pipeline (e.g., can add additional information such as location and entity related data using the graph database), and use that data to determine and execute the configured pipeline steps.

One or more techniques disclosed herein also provide additional technical improvements. For example, many domain providers may have deployment constraints tied to physical locations. As one example, a cruise ship operator may wish to deploy on a cruise ship, a resort or hotel operator may wish to deploy on or near the hotel or resort, a theme park operator may wish to deploy in or near a theme park, or any other suitable domain provider may have deployment constraints. One or more techniques disclosed herein provide for a configurable, and flexible, system that can deployed within suitable physical constraints, or even on an end user device (e.g., in a stand-alone disconnected mode). This system can boot, load, and self-test with all required data stored locally (e.g., on or near an end user device).

As another example, one or more of these techniques can address data reliability, integrity, and security issues raised by LLMs. Many LLMs are operated by third parties, and a domain operator may not wish to provide proprietary or confidential data to such an LLM, in order to preserve the confidentiality and security of the data. Further, LLMs can be prone to hallucination (e.g., responses that may be incorrect or nonsensical), catastrophic forgetting (e.g., a loss of previously acquired knowledge as an LLM is trained with new information), and lack of control (e.g., lack of ability to tune or modify the operation of the LLM). One or more techniques disclosed herein address these issues by providing for locally deployed LLMs that can be safely provided with confidential or proprietary data. Centralized storage of data and configuration in a graph database further allows a system to self-boot, load, self-test and come online with all of its capabilities. If it is connected to back-end services, it can periodically update its graph database with the latest information. If there is no outside connectivity, the system can be deployed with all of its domain specific graph data in a loadable format (e.g., javascript object notation (JSON) files).

Further, one or more of these techniques provide for improved testing. In an embodiment, a system can include any, or all, of a user interface (UI), file import, and application programming interface (API) to support the creation and running of tests to validate the system against sets of natural language queries. This enables administrators to fully configure and test the natural language understanding and ensures a repeatable set of tests against loaded and configured data. This can also enable the pipeline processing to be thoroughly tested in whole and in parts (e.g., intent inference tests, named entity extraction tests, natural language semantic search queries, and graph queries).

Further, one or more techniques provide for higher computational performance compared with existing solutions relying on LLM and vector database approaches. For example, assume a query that needs to search across complex relationships, such as: find all restaurants open until 8 pm this evening in theme park A", would be impossible in an LLM, difficult in a vector database, but fast and simple in a graph database. A traditional RAG approach using a vector database would struggle or fail. But one or more embodiments disclosed herein would succeed with high performance, by inferring the search intent and search parameters and use a graph database search for accuracy and speed. Further, one or more embodiments disclosed herein provide for computational performance improvements by focusing on the intent of a query and narrowing in on specific parts of the knowledge base needed or graph to be explored (e.g. time or location filters based on detected natural language intent). This is a significant improvement over alternative approaches, which typically perform a brute force search through every possible permutation of the data.

FIG. 1 is a block diagram 100 illustrating domain specific search and inference technologies using natural language, according to one embodiment. As discussed above, in an embodiment one or more techniques disclosed herein leverage multiple complimentary technologies deployed as a highly configurable and customizable software service. These components work together to provide a sophisticated natural language semantic search engine that can be flexibly deployed in the cloud, on premise, on device, and even in a disconnected stand-alone mode.

In an embodiment, a given search focus 110 may have a particular preferred search tool. This is because different search tools (e.g., a knowledge graph 122, an NLP ML model 124, a vector database 126, and an LLM 128) have different advantages and disadvantages. An LLM 128 may provide for a high level of semantic inference capability (e.g., among the four illustrated options 122, 124, 126, and 128), but a low search accuracy. By contrast, a knowledge graph 122 may have a relatively low semantic inference capability, but a high search accuracy. A vector database 126 and NLP ML model 124 fall somewhere in between, in terms of semantic inference capability and search accuracy. This makes the different tools more, or less, appropriate for different search focuses 110.

For example, a complex linked data search 112A may be most appropriate for a knowledge graph 122, with its high search accuracy. A key word search 112B may be appropriate for either a knowledge graph 122 or a vector database 126. A temporal data search 112C may be appropriate for either a knowledge graph 122 or an NLP ML model 124 (e.g., an NLP ML model may not be suitable for a temporal search on its own, but can extract temporal data (e.g., dates or times) from search queries, and use that data as parameters for a knowledge graph query later in a search pipeline). A domain vernacular search 112D may be appropriate for a knowledge graph 122, an NLP ML model 124, or a vector database 126. A semantic search 112E may be appropriate for either a vector database 126 or an LLM 128. And complex natural language queries 112F may be appropriate for an LLM 128.

In an embodiment, an intelligent semantic search layer 130 includes a search service 132 that facilitates routing a given input query (e.g., a prompt) through a pipeline of different search tools (e.g., any, or all, of the knowledge graph 122, the NLP ML model 124, the vector database 126, or the LLM 128). This combination of tools can provide for access to a rich set of domain specific knowledge (e.g., in the knowledge graph 122 and vector database 126), while also providing a natural language processing pipeline to extract information from user prompts using multiple search tools, and can translate that prompt analysis data into focused discrete search actions. This is discussed further, below, with regard to FIGS. 3-5. Further, the intelligent semantic search layer 130 includes a prompt enhancement service 134 to enhance an input query. This is discussed further, below, with regard to FIG. 6.

In an embodiment, the various components of the block diagram 100 communicate using one or more suitable communication networks, including the Internet, a wide area network, a local area network, or a cellular network, and uses any suitable wired or wireless communication technique (e.g., WiFi or cellular communication). Further, in an embodiment, the intelligent semantic search layer 130 can be implemented using any suitable combination of physical computing systems, including cloud compute nodes and storage locations or any other suitable implementation.

For example, the intelligent semantic search layer 130 could be implemented using a server or cluster of servers (e.g., one or more on-premises servers). As another example, the intelligent semantic search layer 130 can be implemented using a combination of compute nodes and storage locations in a suitable cloud environment. For example, one or more of the components of the intelligent semantic search layer 130 can be implemented using a public cloud, a private cloud, a hybrid cloud, or any other suitable implementation.

Figure 2:
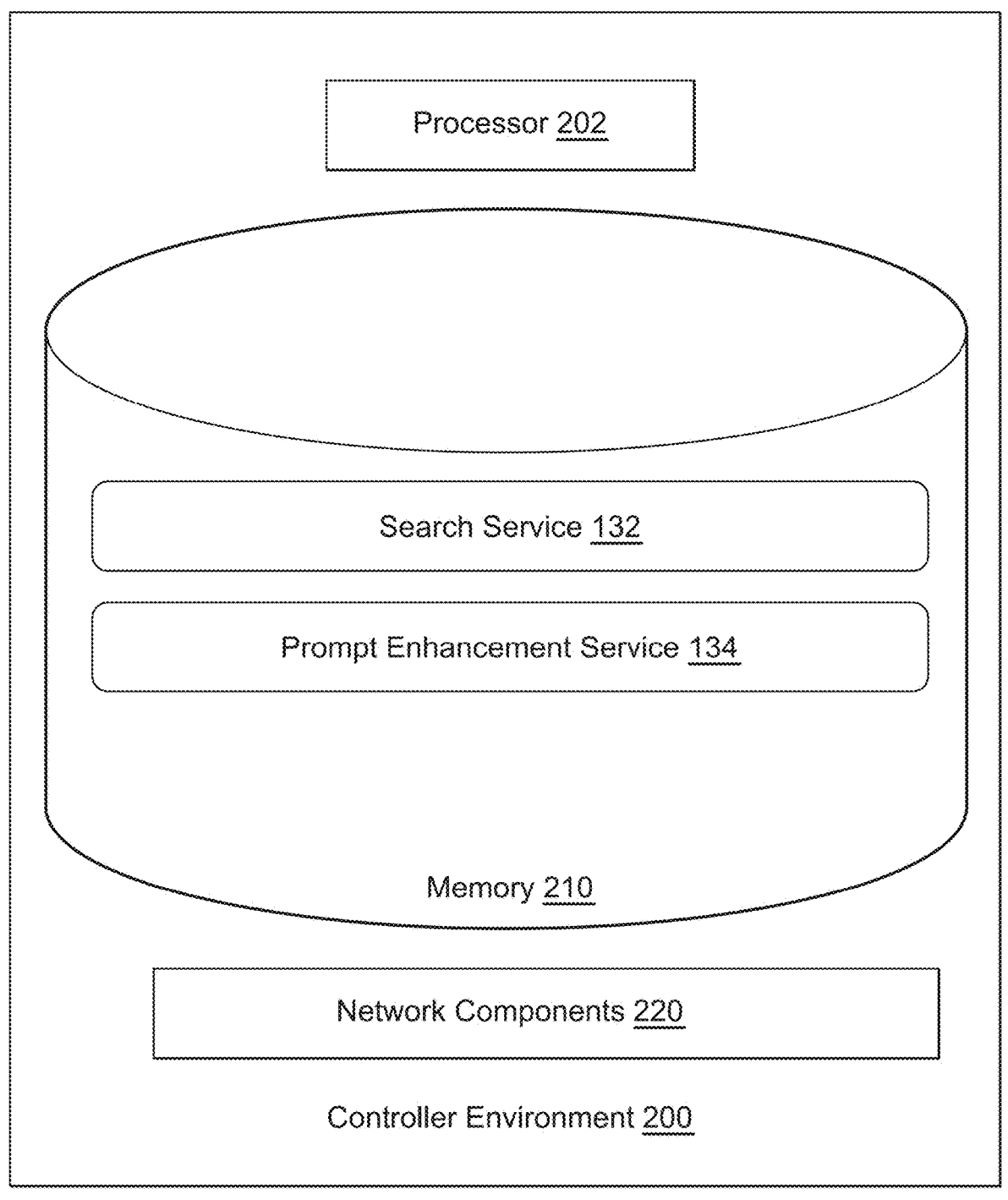
FIG. 2 is a block diagram illustrating a controller for domain specific intelligence using natural language, according to one embodiment.

FIG. 2 is a block diagram illustrating a controller environment 200 for domain specific intelligence using natural language, according to one embodiment. In an embodiment, the controller environment 200 corresponds with one or more aspects of the intelligent semantic search layer 130 illustrated in FIG. 1. The controller environment 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the controller environment 200 to interface with components over a network (e.g., as illustrated in FIG. 1). For example, the controller environment 200 can be a part of the intelligent semantic search layer 130 and the controller environment 200 can use the network components 220 to interface with remote storage and other compute nodes using the network components.

The controller environment 200 can interface with other elements in the system over a local area network (LAN), for example an enterprise network, a wide area network (WAN), the Internet, or any other suitable network. The network components 220 can include wired, WiFi or cellular network interface components and associated software to facilitate communication between the controller environment 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the controller environment 200. The program code is generally described as various functional "applications" or "services" within the memory 210, although alternate implementations may have different functions and/or combinations of functions.

Within the memory 210, a search service 132 facilitates intelligent semantic search. This is discussed further, below, with regard to FIGS. 3-5. A prompt enhancement service 134 facilitates enhancement of semantic search prompts. This is discussed further, below, with regard to FIG. 6.

Although FIG. 2 depicts the search service 132 and prompt enhancement service 134 as located in the memory 210, that representation is merely provided as an illustration for clarity. More generally, the controller environment 200 may include one or more computing platforms, such as computer servers for example, which may be co-located, or may form an interactively linked but distributed system, such as a cloud-based system (e.g., a public cloud, a private cloud, a hybrid cloud, or any other suitable cloud-based system). As a result, the processor 202 and memory 210 may correspond to distributed processor and memory resources within a computing environment.

Figure 3:
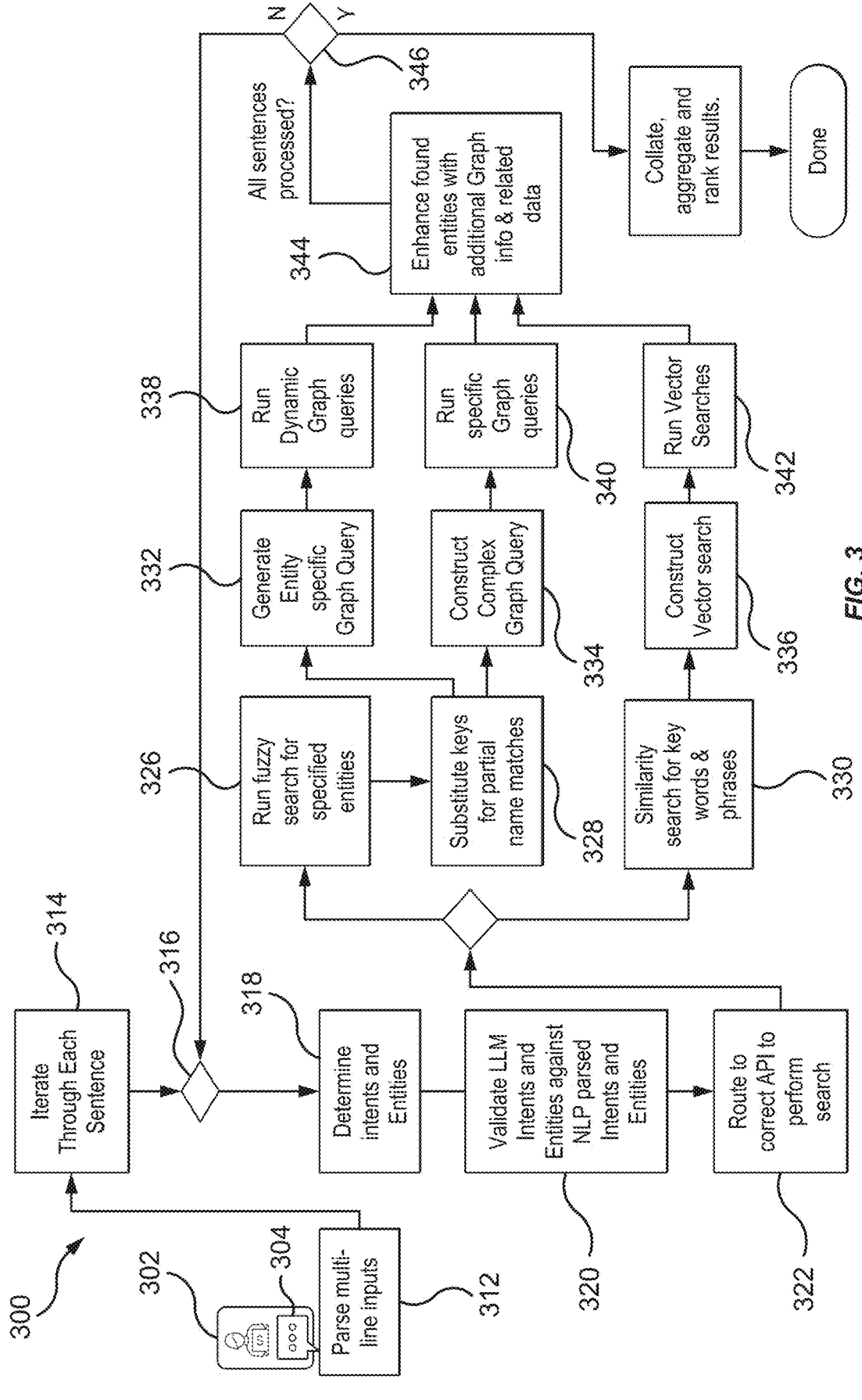
FIG. 3 is a flow diagram illustrating prompt analysis and search flow for domain specific intelligence using natural language, according to one embodiment.

FIG. 3 is a flow diagram 300 illustrating prompt analysis and search flow for domain specific intelligence using natural language, according to one embodiment. In an embodiment, a user 302 enters an input 304 (e.g., a prompt). For example, the user can enter an input query 304 to seek information.

In an embodiment, the input 304 is a complex query with more than two parameters. For example, assume the user is visiting, or considering visiting, an amusement park called CoasterLand. The input 304 could be one of the example queries below:

"What are the wait times for roller coasters at Coaster-Land?"

"What time does CoasterLand close this weekend?"

"What French restaurants serve a croque monsieur in CoasterLand and are open after 7 pm today?

"Where are the nearest restrooms?"

"Is there a store in CoasterLand that sells stuffed koala bears?"

"What is the height limit for the bumper cars?"

"What rides are closed in CoasterLand right now?"

"When is it cheapest for a family of four to visit CoasterLand in August?"

These are merely examples, and any suitable query can be used. Further, while these examples are focused on customer queries, this is merely one example. In an embodiment, the user 302 is an employee of an organization, or any other suitable user, and the query relates to the status of a project within the organization, or any other suitable query.

At block 312, a search service (e.g., the search service 132 illustrated in FIGS. 1-2) parses multi-line inputs. For example, the input 304 could include multiple lines, each of which includes a different query or different portion of a query. The search service can use NLP (e.g., an NLP ML model) to parse the multi-line inputs and identify components (e.g., sentences or any other suitable components). For example, a query could include multiple components (e.g., multiple sentences), and the search service can divide the query into the components (e.g., the different sentences). This is merely an example, and the search service can use any suitable technique and can divide the multi-line input into any suitable portions (e.g., sentences are merely one example).

At block 314, the search service iterates through each sentence. For example, the search service selects a next sentence in the parsed multi-line input from block 312. The search service proceeds through a junction 316 to the block 318.

At block 318, the search service determines intents and entities (e.g., domain specific entities). In an embodiment, the search service uses a LLM to infer user intents and entities and extract classifiers from the query sentence. Further, the search service can use NLP to identify intents and entities (e.g., at block 312, at block 318, or using any other suitable technique).

At block 320, the search service validates LLM inferred intents and entities against NLP parsed intents and entities. In an embodiment, as described above, the search service uses both an LLM and NLP to identify intents and entities in a given query sentence. At block 320, the search service validates these against each other.

In an embodiment, this is an optional step depending on the quality of inference from the LLM. For example, there may be tricky prompts where the NLP parsed intents and entities can be used to prevent incorrect inference from the LLM. For example, assume a query "Find restaurants on Broadway" from a user in a theme park with a Broadway street or region. An LLM will typically interpret this query to mean restaurants on Broadway in New York, NY, or another large city. However, the NLP with pre-loaded domain entities for the theme park would know to interpret this as Broadway in the theme park.

At block 322, the search service routes to the correct API to perform a search. For example, the search service can identify a pipeline to perform the search (e.g., as discussed below in relation to FIGS. 4 and 7A-B). For example, the search service can route domain specific terms (e.g., names of domain specific items for CoasterLand, in the example above) to block 326 for a fuzzy search, and can route remaining items to block 330 for a similarity search.

At block 326, the search service runs a fuzzy search for specified entities. For example, the search service can use a vector database to identify items close to, but not necessarily matching exactly, the search term. Further, at block 328 the search service substitutes keys (e.g., keywords) for partial name matches (e.g., from the results of the fuzzy search).

In an embodiment, the search service provides the output from block 328 to two different paths. One path proceeds to block 332. At block 332, the search service generates an entity specific graph query. For example, the search service can use an LLM to generate a Cypher query for a graph database, based on the identified entity. At block 338, the search service runs the dynamic entity specific graph query (e.g., the Cypher query) against a graph database.

Returning to block 328, the search service can also proceed along a second path to block 334. In an embodiment, the paths from block 328 to block 332, and from block 328 to 334, are branching scenarios in which the search service travels one path, or the other, but not both. This is merely an example. At block 334, the search service constructs a complex graph query (e.g., a complex Cypher query). For example, the search service can use an LLM to construct a complex graph query. At block 340, the search service runs the specific graph query (e.g., generated at block 334) against a graph database.

Returning to block 322, the search service can route the validated query to block 330. At block 330, the search service conducts a similarity search for key words and phrases. For example, the search service can perform inference and parameter extraction, by using an LLM to extract the search parameters (keywords and entity types) to use for the vector search at blocks 336 and 342. For example, the search service can identify an entity type, which directs the vector query to the appropriate collection of objects in the vector space. In an embodiment, vector database typically have collections within which one or more types of objects are stored for vector searches. For example, restaurants and food may be in one vector collection, while attractions and rides might be in another collection. This can lead to improved search results.

At block 336, the search service constructs a vector search. For example, the search service can use the results of the similarity search to construct a search for a vector database. At block 342, the search service runs the vector search(es). For example, the search service can construct one or more vector searches at block 336, and can run those searches against a vector database at block 342.

At block 344 the search service receives the results from the dynamic graph queries at block 338, the specific graph queries at block 340, and the vector searches at block 342. The search service enhances found entities with additional graph information and related data. In an embodiment, this provides significant advantages because it provides for a much more extensive and useful data set to be returned to the user than a typical vector search would support.

At block 346, the search service determines whether all sentences have been processed. If not, the flow returns to a junction 316 and the search service proceeds with the next sentence.

If all sentences have been processed, the flow proceeds to block 348. At block 348, the search service collates, aggregates, and ranks results. These results can then be presented to the user.

Figure 4:
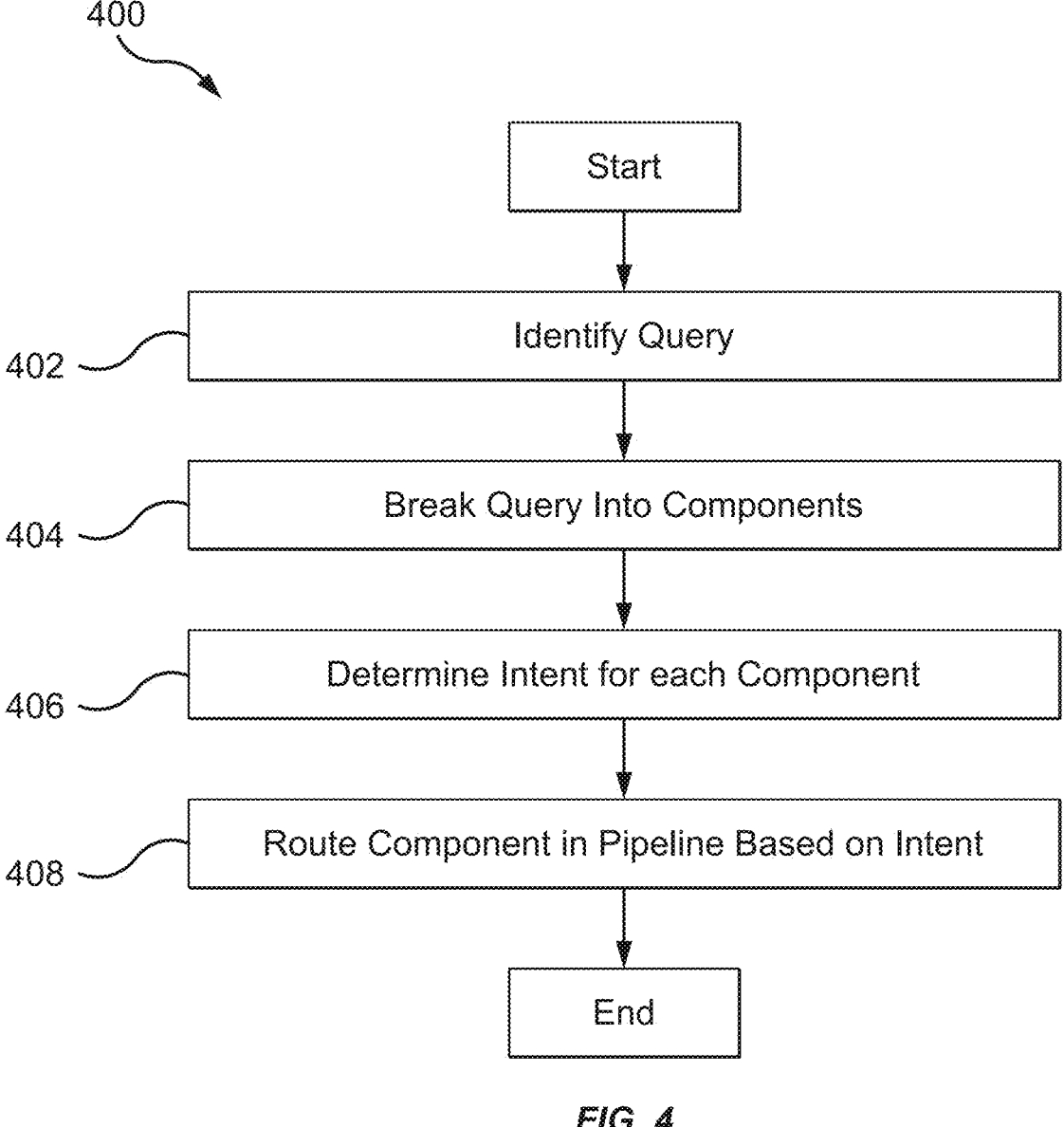
FIG. 4 is a flowchart illustrating domain specific intelligence using natural language, according to one embodiment.

FIG. 4 is a flowchart 400 illustrating domain specific intelligence using natural language, according to one embodiment. At block 402 a search service (e.g., the search service 132 illustrated in FIGS. 1-2) identifies a query. For example, the search service can identify an input query 304 input by a user 302, as illustrated in FIG. 3. As discussed above, in an embodiment the query is complex and includes multiple parameters. The parameters can include location (e.g., physical or virtual location), time, day, entity (e.g., named entity within a given domain), key words, entity types, numbers, amounts, date ranges, costs, search phrases, and any other suitable information.

At block 404, the search service breaks the query into components. For example, the search service can divide a multi-line input into sentences (e.g., as discussed above in relation to block 312 illustrated in FIG. 3). Sentences are merely one example of suitable components, and the search service can break the query into any suitable components.

At block 406, the search service determines intent for each component. For example, as discussed above in relation to block 318 illustrated in FIG. 4, the search service can determine intent using one or more LLMs. Further, the search service can use NLP to parse the component and identify intent.

Figure 7A:
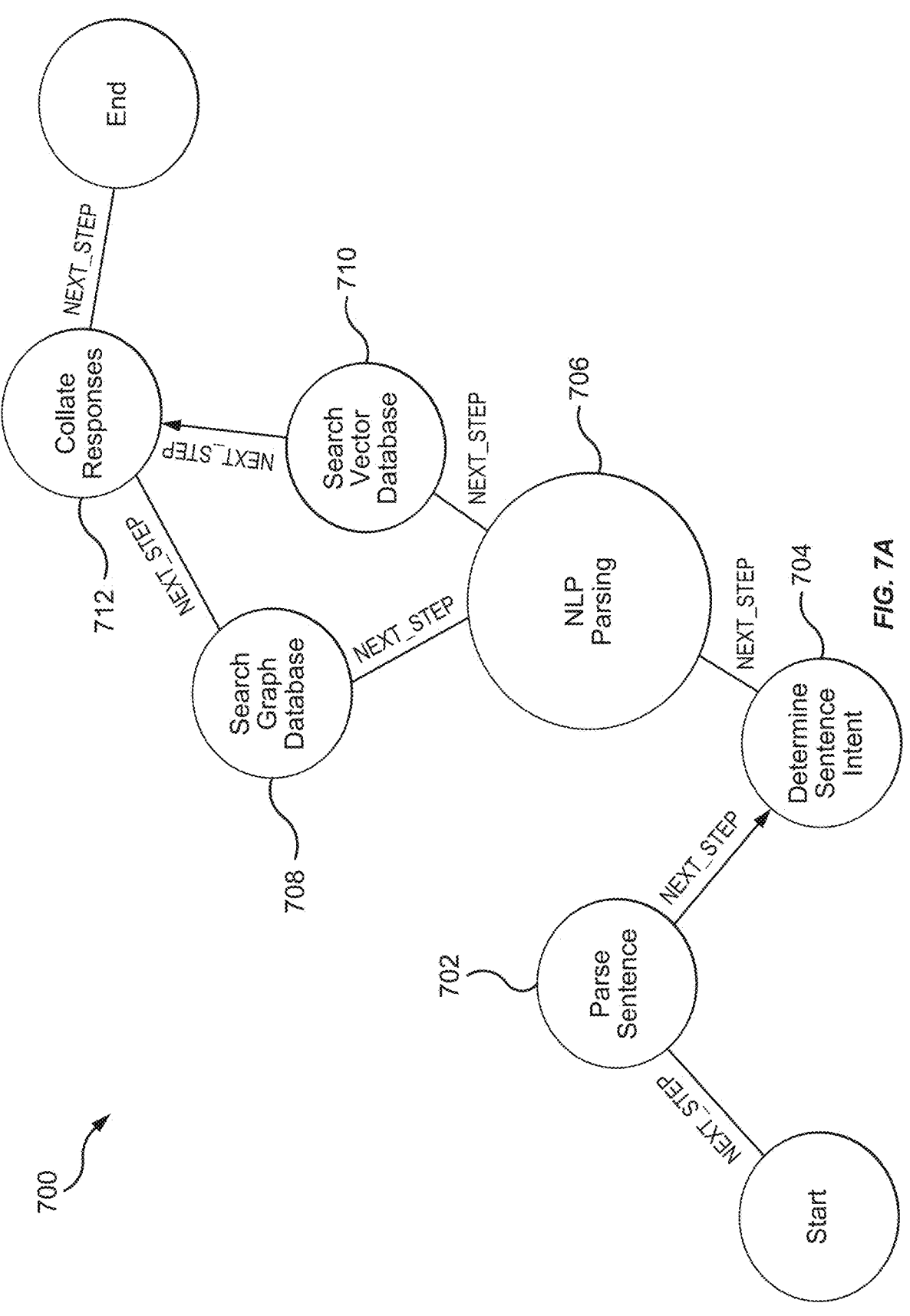
FIGS. 7A-B illustrate example pipelines for domain specific intelligence using natural language, according to one embodiment.
Figure 7B:
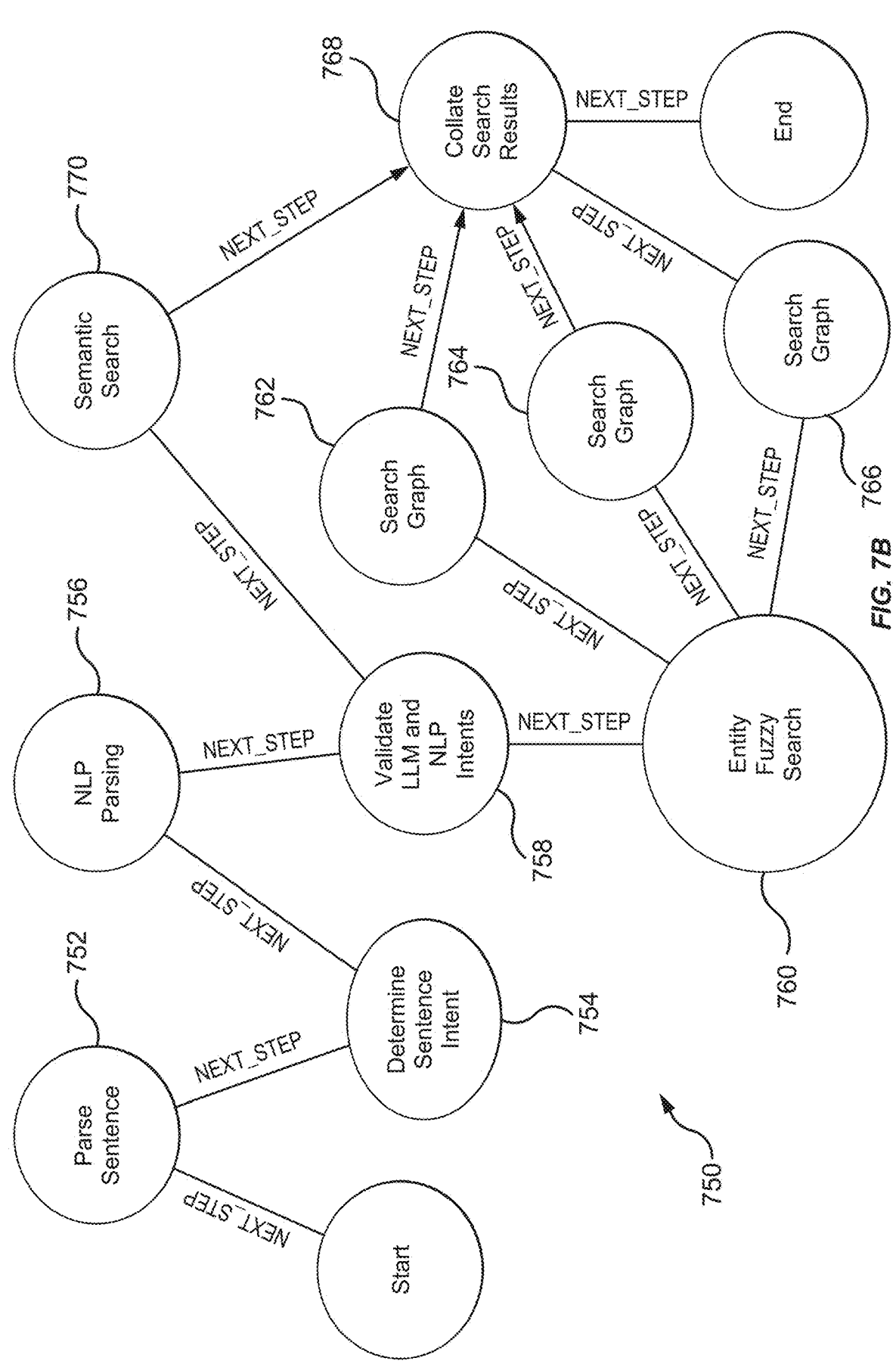

At block 408, the search service routes the component in a pipeline based on intent. In an embodiment, one or more pipelines can be used for domain specific queries. For example, a given domain (e.g., a given corporate entity, physical location, product, or any other suitable domain) can be associated with one or more pipelines. Each pipeline can be configured to answer queries for that domain (e.g., the pipeline can be configured by a knowledge expert), and a given pipeline can be made up of a variety of tools for answering queries in that domain. FIGS. 7A-B, below, illustrate examples of sample pipelines.

In an embodiment, a search service (e.g., the search service 132 illustrated in FIGS. 1-2) follows a pipeline to answer a given query. For example, following a pipeline can generate a number of data points that are then passed to a graph query algorithm that executes the configured pipeline steps in a recursive fashion. After each step is taken, the graph is re-queried to find the next best step based on the current data available. Further, the pipeline can generate a set of features (e.g., flags) that can be used as input to the graph pipeline. This is discussed further, below, with regard to FIG. 5.

Figure 5:
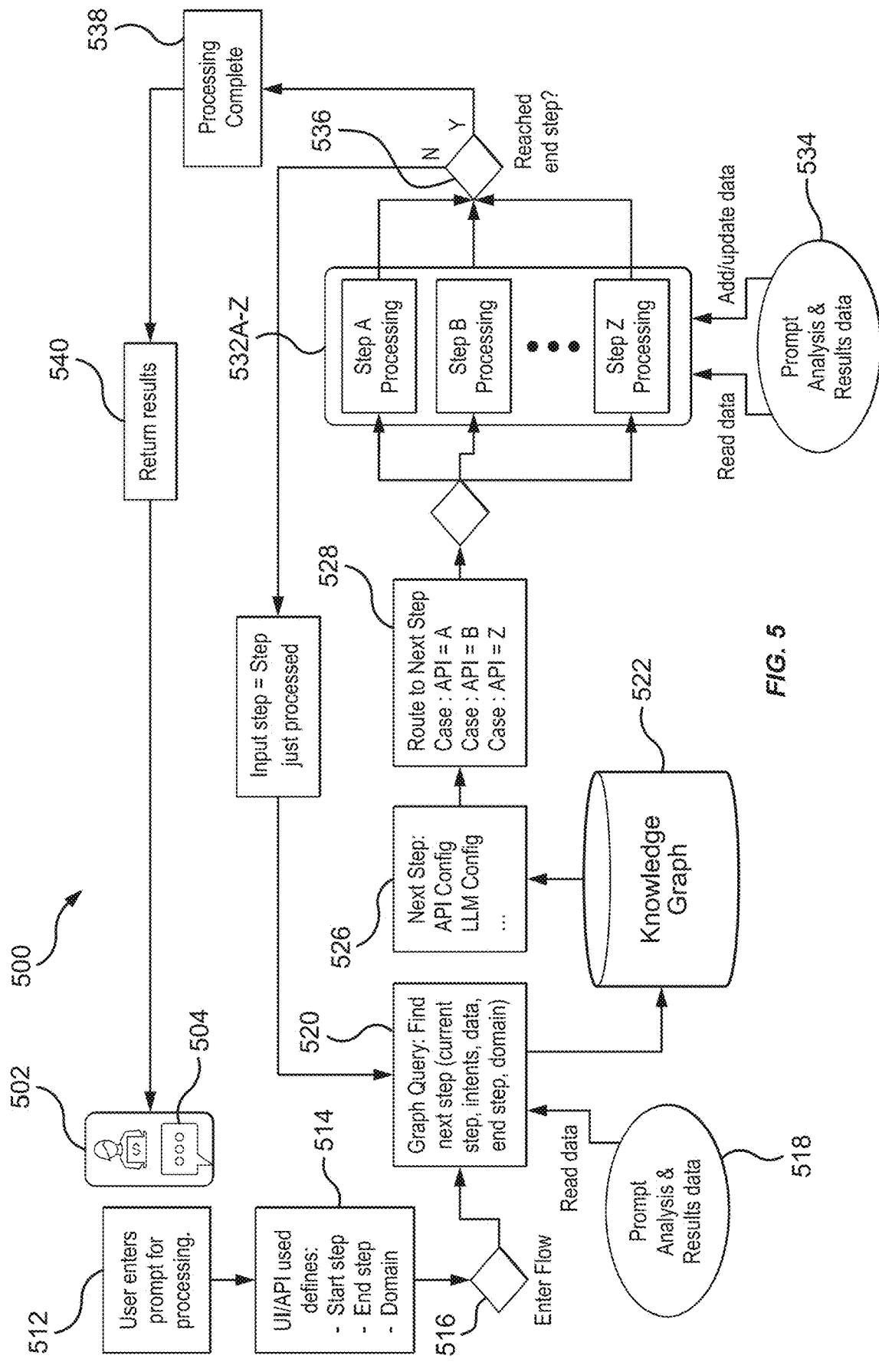
FIG. 5 is a flow diagram illustrating a decision flow for domain specific intelligence using natural language, according to one embodiment.

FIG. 5 is a flow diagram 500 illustrating a decision flow for domain specific intelligence using natural language, according to one embodiment. In an embodiment, FIG. 5 illustrates routing a query in a given pipeline (e.g., as discussed above in relation block 408 illustrated in FIG. 4). At block 512, a user 502 enters an input query 504 (e.g., a prompt) for processing. In an embodiment, this corresponds to FIG. 3, where a user 302 enters an input 304 (e.g., a complex query). At block 514, the user interface (UI) or application programming interface (API) used by the search service defines a start step, an end step, and a domain. At junction 516, the search service enters the flow.

At block 520, the search service generates a graph query. For example, the search service can conduct prompt analysis and modify the input prompt, add additional data, and otherwise enhance the prompt, using prompt analysis and results data 518. This is discussed further, below, with regard to FIG. 6. The search service can use this enhanced prompt to generate a graph query to find the next step in the pipeline. The graph query can further be based on the current step, intents (e.g., as discussed above in relation to block 318 illustrated in FIG. 3), additional data (e.g., from prompt enhancement), an end step, and a domain.

In an embodiment, the search service runs the generated graph query against a knowledge graph 522 to identify the next step. For example, the search service can identify a next step, based on a lowest cost path, as a result of the generated graph query (e.g., a Cypher query). The knowledge graph 522 can further include NLP pipeline flow configuration data. For example, the search service can store any configured LLM templates its needs for execution that calls the LLM. The pipeline step configuration can further include an internal query API to call to execute a step (which may route to a database or any other suitable internal or external API).

In an embodiment, running the graph query generated at block 520 against the knowledge graph 522 identifies a next step 526. For example, the next step 526 can identify API configuration information and LLM configuration information for the next step.

At block 528, the search service routes the flow to the next step in the pipeline (e.g., the next step 526). In an embodiment, the next step can select between multiple options. For example, the next step can include one or more of the steps A-Z. At blocks 532A-Z, the search service processes these steps A-Z. Further, the search service can recursively update data used in the processing as part of prompt analysis. The search service can read data from the prompt analysis and results data 534, and can add or update date based on the processing. In an embodiment, the prompt analysis and results data 534 corresponds with the prompt analysis and results data 518. This is merely an example. Further, in an embodiment, the search service can conduct real-time API calls (e.g., to address time-sensitive queries, like wait times for a ride or restaurant). This can be done in connection with blocks 532A-Z, 534, or any other suitable aspect.

At block 536, the search service determines whether the pipeline has reached its end step. If not, the flow returns to block 520 and the search service identifies another next step. If so, the flow proceeds to block 538, completes processing, and returns the results at block 540.

Figure 6:
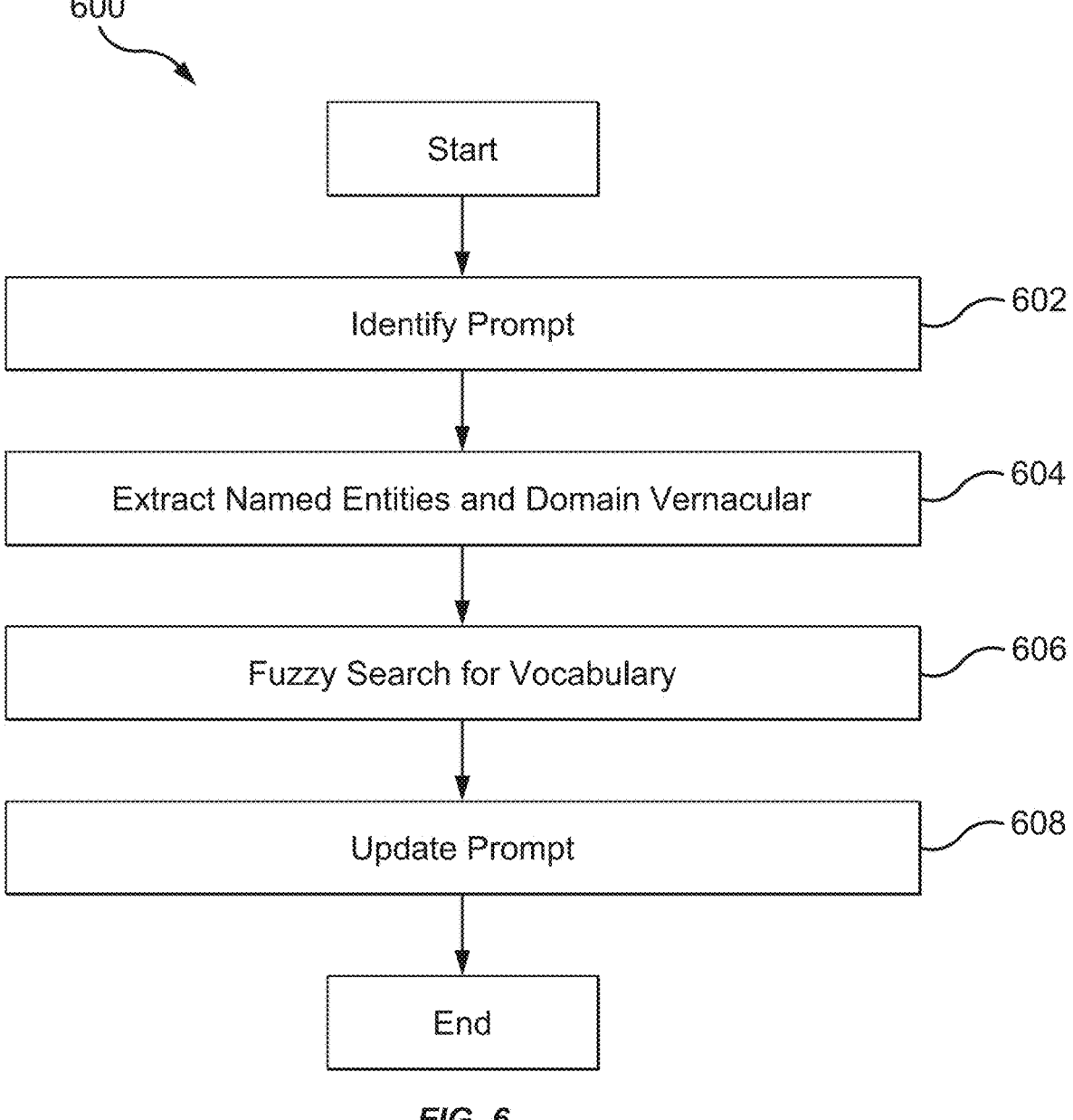
FIG. 6 is a flowchart illustrating prompt enhancement for domain specific intelligence using natural language, according to one embodiment.

FIG. 6 is a flowchart 600 illustrating prompt enhancement for domain specific intelligence using natural language, according to one embodiment. In an embodiment, a prompt includes named entities (e.g., date, time, or domain-specific names). These named entity words can be removed from a query prompt before processing (e.g., before general query matching in a vector database). This improves the accuracy of the query as it avoids having words like 8 pm, or this weekend from being passed into a vector space for similarity search.

At block 602, a prompt enhancement service (e.g., the prompt enhancement service 134 illustrated in FIGS. 1-2) identifies a prompt. For example, the prompt can be an input query from a user (e.g., the input query 304 illustrated in FIG. 3). This is merely an example, and the prompt can be provided from any suitable source (e.g., an automated source rather than a human user, or any other suitable source).

At block 604, the prompt enhancement service extracts named entities and domain vernacular. In an embodiment, the prompt enhancement service uses NLP and a database of domain specific terms to identify named entities and domain vernacular in a prompt. The prompt enhancement service can extract these terms both to provide similar terms to bolster a prompt, and to remove terms to improve matching accuracy.

At block 606, the prompt enhancement service performs a fuzzy search for vocabulary. In an embodiment, as discussed above in relation to block 326 illustrated in FIG. 3, the prompt enhancement service performs a fuzzy search to identify similar terms for the prompt. Further, in an embodiment the prompt enhancement service can substitute keys for partial name matches (e.g., as discussed above in relation to block 328 illustrated in FIG. 3).

At block 608, the prompt enhancement service updates the prompt. For example, the prompt enhancement service can add to the prompt similar terms and substitute keys identified at block 606. Alternatively, or in addition, the prompt enhancement service can remove named entities from the prompt to improve accuracy.

FIGS. 7A-B illustrate example pipelines for domain specific intelligence using natural language, according to one embodiment. As discussed above in relation to block 408 illustrated in FIG. 4, in an embodiment one or more pipelines can be used for domain specific queries. For example, a given domain can be associated with one or more pipelines. The pipeline can be configured to answer queries for that domain (e.g., the pipeline can be configured by a knowledge expert), and a given pipeline can be made up of a variety of tools for answering queries in that domain.

FIG. 7A illustrates one example pipeline 700. After the start of the pipeline, the next step is to parse an input sentence at step 702 (e.g., as discussed above in relation to block 312 illustrated at FIG. 3). A next step 704 is to determine sentence intent (e.g., using an LLM, NLP ML model, or both), followed by an NLP parsing step 706. The pipeline then branches into two options: a step 708 to search a graph database and a step 710 to search a vector database. A step 712 collates responses, and the pipeline ends.

FIG. 7B illustrates another example pipeline 750. For example, the pipeline 750 could be used with a different domain than the pipeline 700 illustrated in FIG. 7A. After the start of the pipeline, the next step is to parse an input sentence at step 752 (e.g., as discussed above in relation to block 312 illustrated at FIG. 3). A next step 754 is to determine sentence intent (e.g., using an LLM, NLP ML model, or both), followed by an NLP parsing step 756. A next step 758 validates LLM and NLP intents (e.g., as discussed above in relation to block 320 illustrated in FIG. 3).

The pipeline then branches into two options after step 758: a step 760 conducts an entity fuzzy search, and a step 770 conducts a semantic search. After the step 760, three steps 762, 764, and 766 conduct graph searches (e.g., for different aspects of the parsed sentence). The outputs of the semantic search step 770 and the three graph search steps 762, 764, and 766 are collated at step 768, and the pipeline ends.

In an embodiment, the output can be formatted into a speech-like sentence or paragraph, and presented to the user. For example, the results for a multi-sentence query (e.g., the input 304 illustrated in FIG. 3) can be collated, and transformed into a plain text summary (e.g., using an LLM). Further, the results can be transformed into any suitable output format, including an output format requested by a user (e.g., an HTML table for display). Results can further be re-ranked using one or more suitable techniques (e.g., vector search score sorting, LLM based re-ranking using the input prompt and search results, additional filtering or sorting based on subsequent sentences in the original prompt, or any other suitable technique). In an embodiment, the output is intended to answer the initial query from the user, providing a direct summary answer, a list of relevant results, or any other suitable response.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
identifying a complex search query comprising more than two parameters;
dividing the complex search query into a first component and a second component;
determining a first intent for the first component by processing the first component using machine learning (ML), the ML comprising at least one of: a large language model (LLM) or natural language processing (NLP) neural network;
determining a second intent for the second component by processing the second component using the ML; and
generating a result for the complex search query, comprising routing the first and second components through a pipeline based on the first and second intents, comprising:
based on the first intent for the first component, generating and executing a query against a graph database; and
based on the second intent for the second component, generating and executing a search against a vector database.

2. The method of claim 1, wherein determining the first intent for the first component comprises using both the LLM and the NLP neural network.

3. The method of claim 2, wherein determining the first intent comprises:

validating one or more intents determined using the LLM against one or more intents determined using the NLP neural network.

4. The method of claim 1, further comprising:
enhancing the complex search query, comprising:
conducting a fuzzy search using one or more terms in the complex search query.

5. The method of claim 4, wherein enhancing the complex search query further comprises:
removing one or more terms from the complex search query.

6. The method of claim 1, wherein generating the result for the complex search query based on routing the first and second components through the pipeline based on the first and second intents further comprises:
identifying, for the second component, a next step in the pipeline based on a current step in the pipeline and the second intent.

7. The method of claim 6, wherein identifying the next step in the pipeline comprises:
generating a graph database query based on the current step in the pipeline and the second intent.

8. The method of claim 7, comprising:
generating the graph database query using an LLM.

9. The method of claim 6, wherein identifying the next step in the pipeline is further based on data generated during a previous step in the pipeline.

10. The method of claim 1, wherein the parameters comprise both a temporal parameter and a domain-specific vernacular parameter.

11. A non-transitory computer program product comprising:
one or more non-transitory computer readable media containing, in any combination, computer program code that, when executed by operation of any combination of one or more processors, performs operations comprising:
identifying a complex search query comprising more than two parameters;
dividing the complex search query into a first component and a second component;
determining a first intent for the first component using by processing the first component using machine learning (ML), the ML comprising at least one of: a large language model (LLM) or natural language processing (NLP) neural network;
determining a second intent for the second component by processing the second component using the ML; and
generating a result for the complex search query, comprising routing the first and second components through a pipeline based on the first and second intents, comprising:
based on the first intent for the first component, generating and executing a query against a graph database; and
based on the second intent for the second component, generating and executing a search against a vector database.

12. The non-transitory computer program product of claim 11, wherein determining the first intent for the first component comprises using both the LLM and the NLP neural network.

13. The non-transitory computer program product of claim 11, the operations further comprising:
enhancing the complex search query, comprising at least one of:

conducting a fuzzy search using one or more terms in the complex search query; or removing one or more terms from the complex search query.

14. The non-transitory computer program product of claim 11, wherein generating the result for the complex search query based on routing the first and second components through the pipeline based on the the first and second intents further comprises:

identifying, for the second component, a next step in the pipeline based on a current step in the pipeline and the second intent.

15. The non-transitory computer program product of claim 14, wherein identifying the next step in the pipeline comprises:

generating a graph database query based on the current step in the pipeline and the second intent.

16. A system, comprising:

one or more processors; and one or more memories storing a program, which, when executed on any combination of the one or more processors, performs operations, the operations comprising:

identifying a complex search query comprising more than two parameters;

dividing the complex search query into a first component and a second component;

determining a first intent for the first component by processing the first component using machine learning (ML), the ML comprising at least one of: a large language model (LLM) or natural language processing (NLP) neural network;

determining a second intent for the second component by processing the second component using the ML; and generating a result for the complex search query, comprising routing the first and second components through a pipeline based on the first and second intents, comprising:

based on the first intent for the first component, generating and executing a query against a graph database; and based on the second intent for the second component-of the one, generating and executing a search against a vector database.

17. The system of claim 16, wherein determining the first intent for the first component comprises using both the LLM and the NLP neural network.

18. The system of claim 16, the operations further comprising:

enhancing the complex search query, comprising at least one of:

conducting a fuzzy search using one or more terms in the complex search query; or removing one or more terms from the complex search query.

19. The system of claim 16, wherein generating the result for the complex search query based on routing the first and second components through the pipeline based on the first and second intents further comprises:

identifying, for the second component, a next step in the pipeline based on a current step in the pipeline and the second intent.

20. The system of claim 19, wherein identifying the next step in the pipeline comprises:

generating a graph database query based on the current step in the pipeline and the second intent.

* * * * *